US012725590B2

(12) United States Patent
Kwon

(10) Patent No.: US 12,725,590 B2
(45) Date of Patent: Sep. 1, 2026

(54) METHOD FOR LAYERING AND MIXING MONAURAL BEATS TO HELP SLEEP

(71) Applicant: MUNICE CO., LTD, Seoul (KR)

(72) Inventor: Seo-Hyun Kwon, Incheon (KR)

(73) Assignee: MUNICE CO., LTD, Seoul (KR)

( * ) Notice: Subject to any disclaimer, the term of this patent is extended or adjusted under 35 U.S.C. 154(b) by 725 days.

(21) Appl. No.: 18/255,735

(22) PCT Filed: Sep. 27, 2021

(86) PCT No.: PCT/KR2021/013110
§ 371 (c)(1),
(2) Date: Jun. 2, 2023

(87) PCT Pub. No.: WO2022/131495
PCT Pub. Date: Jun. 23, 2022

(65) Prior Publication Data

US 2024/0029694 A1 Jan. 25, 2024

(30) Foreign Application Priority Data

Dec. 15, 2020 (KR) ........................ 10-2020-0175044

(51) Int. Cl.
*G10H 1/00* (2006.01)

(52) U.S. Cl.
CPC ..... *G10H 1/0025* (2013.01); *G10H 2220/376* (2013.01)

(58) Field of Classification Search
CPC .. G10H 1/0025; G10H 2220/376; G10H 1/40; G10H 2210/301; G10H 1/00; A61M 2021/0027; A61M 2230/10; A61M 21/02; A61M 21/00
See application file for complete search history.

(56) References Cited

U.S. PATENT DOCUMENTS

| | | | | |
|---|---|---|---|---|
| 9,707,372 | B2 * | 7/2017 | Smith | A61M 21/0094 |
| 2025/0050056 | A1 * | 2/2025 | Lee | A61B 5/4812 |

FOREIGN PATENT DOCUMENTS

| | | | | |
|---|---|---|---|---|
| KR | 10-2011-0050403 A | 5/2011 | | |
| KR | 10-1601957 B1 | 3/2016 | | |
| KR | 10-1687321 B1 | 12/2016 | | |
| KR | 10-1965233 B1 | 4/2019 | | |
| WO | WO-2017094927 A1 * | 6/2017 | | B60K 28/06 |
| WO | WO-2020220140 A1 * | 11/2020 | | H04S 1/007 |

* cited by examiner

*Primary Examiner* — Jeffrey Donels
(74) *Attorney, Agent, or Firm* — Rabin & Berdo, P.C.

(57) ABSTRACT

A method for layering and mixing monaural beats to help sleep is proposed. In the method for layering and mixing the monaural beats, a plurality of monaural beats is mixed and output in a waveform to help sleep, so as to generate a plurality of monaural beats by loading a plurality of pieces of frequency data according to a selected brain wave waveform, adjust decibels of the plurality of monaural beats, and generate one analog wave file by mixing the plurality of adjusted monaural beats, whereby brainwave entrainment may be further improved and performed in a short time.

4 Claims, 11 Drawing Sheets

| | Without MB | | With MB | | With Layered MB | |
|---|---|---|---|---|---|---|
| |  | |  | |  | |
| Delta | 57.44 to 72.533 | +31.5% | 65.037 to 72.162 | +10.96% | 66.401 to 102.844 | +54.88% |
| Theta | 53.363 to 65.029 | +21.86% | 59.709 to 64.052 | +7.27% | 58.165 to 85.302 | +46.66% |
| Beta | 62.118 to 57.136 | -8.02% | 55.035 to 54.399 | -1.16% | 54.84 to 55.713 | +1.59% |
| Alpha | 69.451 to 72.097 | +3.81% | 65.304 to 75.294 | +15.3% | 70.807 to 87.901 | +24.14% |
| Gamma | 48.25 to 33.72 | -30.11% | 34.818 to 30.161 | -13.38% | 32.944 to 31.633 | -3.98% |

| | Without MB | | With MB | | With Layered MB | |
|---|---|---|---|---|---|---|
| |  | |  | |  | |
| Delta | 58.38 to 69.098 | +18.36% | 101.981 to 60.47 | -40.7% | 49.476 to 70.463 | +42.42% |
| Theta | 61.381 to 59.738 | -2.68% | 73.72 to 52.087 | -29.34% | 54.172 to 60.846 | +12.32% |
| Beta | 66.453 to 61.474 | -7.49% | 69.514 to 52.323 | -24.73% | 54.209 to 54.453 | +0.45% |
| Alpha | 89.148 to 81.351 | -8.75% | 96.414 to 65.321 | -32.25% | 87.509 to 77.353 | -11.61% |
| Gamma | 56.835 to 47.367 | -16.66% | 51.751 to 33.866 | -34.56% | 34.486 to 33.673 | -2.36% |

| | Without MB | | With MB | | With Layered MB | |
|---|---|---|---|---|---|---|
| |  | |  | |  | |
| Delta | 96.58 to 91.754 | -5% | 76.899 to 63.805 | -17.03% | 110.273 to 92.766 | -15.88% |
| Theta | 72.235 to 64.534 | -10.66% | 62.153 to 53.921 | -13.24% | 70.562 to 67.052 | -4.97% |
| Beta | 55.532 to 57.867 | +4.2% | 53.635 to 54.978 | +2.5% | 55.906 to 56.64 | +1.31% |
| Alpha | 85.299 to 77.75 | -8.85% | 79.662 to 77.676 | -2.49% | 72.733 to 77.749 | +6.9% |
| Gamma | 43.308 to 53.234 | +22.92% | 41.695 to 50.05 | +20.04% | 41.886 to 51.612 | +23.22% |

| | Without MB | | With MB | | With Layered MB | |
|---|---|---|---|---|---|---|
| |  | |  | |  | |
| Delta | 67.706 to 57.149 | -15.59% | 60.917 to 51.315 | -15.76% | 50.812 to 64.13 | +26.21% |
| Theta | 52.687 to 45.405 | -13.82% | 48.963 to 41.388 | -15.47% | 41.438 to 50.552 | +21.99% |
| Beta | 52.677 to 51.625 | -2% | 53.474 to 50.653 | -5.28% | 50.133 to 47.911 | -4.43% |
| Alpha | 64.591 to 59.423 | -8% | 59.589 to 54.661 | -8.27% | 54.884 to 64.497 | +17.52% |
| Gamma | 41.086 to 36.518 | -11.12% | 42.149 to 32.876 | -22% | 35.649 to 21.928 | -38.49% |

| | Without MB | | With MB | | With Layered MB | |
|---|---|---|---|---|---|---|
| |  | |  | |  | |
| Delta | 55.991 to 63.084 | +12.67% | 52.359 to 48.864 | -6.68% | 52.276 to 50.415 | -2.56% |
| Theta | 62.44 to 64 | +2.5% | 58.055 to 56.03 | -3.49% | 54.105 to 54.779 | +1.25% |
| Beta | 64.22 to 62.155 | -3.22% | 61.062 to 57.582 | -5.7% | 57.012 to 55.97 | -1.83% |
| Alpha | 87.824 to 89.138 | +1.5% | 86.483 to 84.167 | -2.68% | 82.942 to 80.354 | -3.12% |
| Gamma | 59.538 to 55.468 | -6.84% | 52.72 to 46.917 | -11.01% | 47.519 to 45.254 | -4.77% |

| | Without MB | | With MB | | With Layered MB | |
|---|---|---|---|---|---|---|
| |  | |  | |  | |
| Delta | 76.424 to 62.314 | -18.46% | 69.143 to 61.627 | -10.87% | 63.686 to 66.048 | +3.71% |
| Theta | 59.577 to 54.965 | -7.74% | 57.852 to 52.319 | -9.56% | 54.28 to 57.667 | +6.24% |
| Beta | 67.633 to 68.077 | +0.66% | 70.113 to 64.399 | -8.15% | 62.257 to 61.673 | -0.94% |
| Alpha | 88.598 to 72.425 | -18.25% | 83.687 to 64.874 | -22.48% | 70.208 to 70.964 | +0.69% |
| Gamma | 63.728 to 61.246 | -3.89% | 63.249 to 54.86 | -13.26% | 50.657 to 49.852 | -1.59% |

| | Without MB | | With MB | | With Layered MB | |
|---|---|---|---|---|---|---|
| |  | |  | |  | |
| Delta | 70.943 to 61.91 | -12.73% | 59.773 to 60.157 | +0.64% | 63.624 to 59.413 | -6.62% |
| Theta | 67.755 to 65.909 | -2.72% | 61.163 to 60.772 | -0.64% | 59.26 to 64.201 | +8.34% |
| Beta | 66.417 to 65.487 | -1.4% | 64.61 to 65.039 | +0.66% | 63.716 to 66.356 | +4.14% |
| Alpha | 91.989 to 91.994 | +0.01% | 89.357 to 89.449 | +0.1% | 83.189 to 92.077 | +10.68% |
| Gamma | 56.748 to 51.975 | -8.41% | 49.389 to 50.302 | +1.85% | 48.944 to 51.078 | +4.36% |

| | Without MB | | With MB | | With Layered MB | |
|---|---|---|---|---|---|---|
| |  | |  | |  | |
| Delta | 75.277 to 54.917 | -27.05% | 59.948 to 64.787 | +8.07% | 59.839 to 74.272 | +24.12% |
| Theta | 66.796 to 52.096 | -22.01% | 56.502 to 52.505 | -7.07% | 49.65 to 60.537 | +24.93% |
| Beta | 65.245 to 69.007 | +5.77% | 71.547 to 68.869 | -3.74% | 72.618 to 68.81 | -5.24% |
| Alpha | 75.875 to 71.815 | -5.35% | 68.255 to 68.08 | -0.26% | 70.033 to 71.382 | +1.93% |
| Gamma | 53.298 to 51.302 | -3.74% | 55.15 to 51.375 | -6.84% | 56.351 to 49.973 | -11.32% |

METHOD FOR LAYERING AND MIXING MONAURAL BEATS TO HELP SLEEP

TECHNICAL FIELD

The present disclosure relates to a method for layering and mixing monaural beats to help sleep and, more particularly, to a method for layering and mixing monaural beats, the method for mixing and outputting a plurality of monaural beats in a waveform to help sleep.

BACKGROUND ART

In general, human brain waves are classified into delta waves, theta waves, alpha waves, beta waves, gamma waves, and the like according to frequency bands thereof.

First, the delta waves have a frequency band of 1 to 4 Hz, have large amplitudes thereof, and are waveforms appearing in a deep sleep state of not dreaming.

In addition, the theta waves are brain waves of 5 to 8 Hz and are generated in a specific sleep state. The theta waves are waveforms appearing even during deep meditation and are also known to be involved in a process of consolidating memories, which are obtained by learning, during sleep.

Next, the alpha waves are brain waves of 9 to 12 Hz and appear in an arousal state when a person rests quietly.

In addition, the beta waves are brain waves of 13 to 29 Hz and are waveforms appearing when the cerebral cortex performs general cognitive thinking activities in an arousal state with a rhythm of the cerebral cortex that is activated.

In addition, the gamma waves are waveforms of 30 to 80 Hz, are high-frequency brain waves appearing in a state of tension or excitement, and are known as waveforms appearing in a high concentration state.

Among those waves, the delta waves, theta waves, and alpha waves are brain waves related to human sleep, and research on brain wave control technology that enables a user to tune brain waves having frequencies the user desires is being actively conducted.

Since these brain waves such as delta waves, theta waves, alpha waves, and the like are in a range of frequency of 12 Hz or less, the frequency being far smaller than the human audible frequency of 20 Hz to 20 kHz, the brain waves are unable to be heard by human ears. In most cases, a so-called binaural beat technique is used as sound stimulation for brain wave induction.

As an example of the technology related to a sleep induction device using such binaural beats, a patent titled as "APPARATUS FOR INDUCING SLEEP AND SLEEP MANAGEMENT SYSTEM COMPRISING THE SAME" has been proposed in Korean Patent No. 10-1687321 (Reference 1).

However, such methods use a difference between signals heard from both left and right sides, so it is effective only when a user wears a headphone or earphone, thereby being inconvenient to use.

Meanwhile, as an example of a technology capable of enhancing user convenience by arousing a user or ensuring a stress relief effect only by outputting monaural beats through a speaker without the need for the user to wear sound output means such as headphones or earphones on his or her body, a patent titled as "MANAGING APPARATUS AND METHOD FOR DRIVER BASED ON MONAURAL BEATS" has been proposed in Korean Patent No. 10-1601057 (Reference 2).

However, the method of Reference 2 is insufficient to maximally increase a sleep effect by simply correcting and outputting monaural beats when alpha waves are selected according to signals selected and input through a user or other ways.

DISCLOSURE

Technical Problem

Accordingly, the present disclosure is for solving such problems, and an objective of the present disclosure is to provide a method for layering and mixing monaural beats, the method inducing brainwave entrainment to be further improved and be performed in a short time by mixing and outputting a plurality of monaural beats in a form of waves to help sleep.

In addition, another objective of the present disclosure is to provide a method for layering and mixing monaural beats, the method mixing the monaural beats to maximally increase a sleep effect while outputting sounds to an audio output device such as a normal speaker.

Technical Solution

In order to solve such technical problems, the present disclosure provides a method for layering and mixing monaural beats to help sleep, the method including: a first step of generating a plurality of monaural beats by loading a plurality of pieces of frequency data according to a selected brain wave waveform; a second step of adjusting decibels of the plurality of monaural beats; and a third step of generating one analog wave file by mixing the plurality of adjusted monaural beats.

In this case, the first step may be a step of generating the plurality of monaural beats having a form of high carrier frequencies by adding the respective pieces of frequency data to a low carrier frequency.

The frequency data may be selected from frequency data of delta waves corresponding to 1 to 4 Hz, frequency data of theta waves corresponding to 5 to 8 Hz, and frequency data of alpha waves corresponding to 9 to 12 Hz, the low carrier frequency may be 133 Hz, and in the monaural beats, respective values same as selected frequency numbers are added to generate each of the plurality of monaural beats having the form of high carrier frequencies.

In addition, the second step may be a step of selecting a main monaural beat from among the plurality of monaural beats and adjusting decibels of remaining monaural beats to be lowered.

In addition, the method may further include a fourth step of selecting the brain wave waveform of any one of delta waves, theta waves, and alpha waves before the first step.

Advantageous Effects

According to the present disclosure, a plurality of monaural beats in a waveform is generated, mixed, and provided simultaneously, whereby not only brainwave entrainment is further improved to help a user's sleep but also the brainwave entrainment is induced in a short time.

In addition, according to the present disclosure, since various sound output devices such as normal speakers are usable as monaural beats are mixed and output, a user may induce comfortable sleep without wearing an earphone or headphone.

BEST MODE

Figure 1:
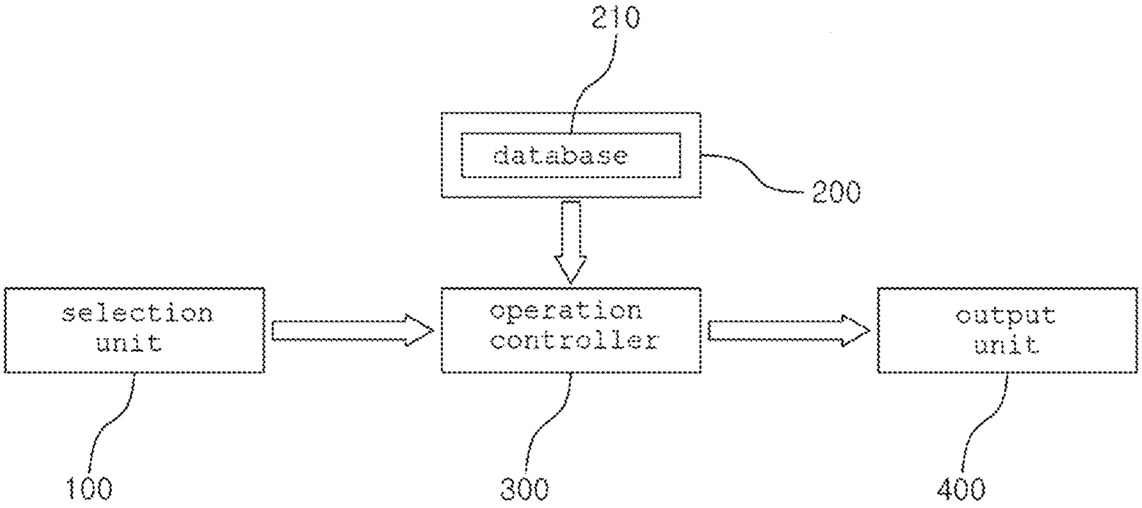
FIG. 1 is a block diagram illustrating control of a device for layering and mixing monaural beats to help sleep according to the present disclosure.

Hereinafter, the characteristics of a method for layering and mixing monaural beats to help sleep according to the present disclosure will be understood by an exemplary embodiment described in detail with reference to the accompanying drawings.

Prior to this, the terms or words used in the present specification and claims are not to be construed as being limited to their ordinary or dictionary meanings, and should be interpreted as meanings and concepts corresponding to the technical spirit of the present disclosure based on the principle that inventors may properly define the concept of each term in order to best describe their embodiments.

Therefore, the exemplary embodiments and the configurations shown in the drawings, which are described in the present specification, are only the most preferred exemplary embodiments of the present disclosure, and do not represent all the technical ideas of the present disclosure, so it should be appreciated that there may be various equivalents and variant examples that may be substituted therefor at the time when the present application is filed.

Referring to FIG. 1, the method for layering and mixing monaural beats to help sleep according to the present disclosure is a method capable of performing brainwave entrainment at a faster time by mixing and outputting a plurality of monaural beats in a form of waves to help sleep.

As such, the embodiment of the present disclosure includes: a selection unit 100 configured to select a brain wave waveform; a data storage 200 configured to store frequency data according to the brain wave waveform; an operation controller 300 configured to load, from the data storage unit 200, a plurality of pieces of frequency data according to the brain wave waveform selected by the selection unit 100, generate a plurality of monaural beats, adjust decibels, and then mix the monaural beats; and an output unit 400 configured to output the monaural beats mixed by the operation controller 300.

To describe more specifically, the selection unit 100 is for selecting any one of sleep-related brain waves, such as delta waves, theta waves, and alpha waves, and a user may select one.

Here, the delta waves have a frequency band of 1 to 4 Hz, have large amplitudes, and are waveforms appearing in a deep sleep state of not dreaming.

In addition, the theta waves are brain waves of 5 to 8 Hz, and are generated in a specific sleep state. The theta waves are waveforms appearing even during deep meditation, and are also known to be involved in a process of consolidating memories, which are obtained by learning, during sleep.

Next, the alpha waves have a frequency band of 9 to 12 Hz, and are brain waves appearing in an arousal state when a person rests quietly.

In addition, the beta waves have a frequency band of 13 to 29 Hz, and are waveforms appearing when the cerebral cortex performs general cognitive thinking activities in an arousal state with a rhythm of the cerebral cortex that is activated.

Meanwhile, the data storage 200 is for storing frequency data according to electric currents, and the frequency data includes: frequency data of delta waves corresponding to 1 to 4 Hz; frequency data of theta waves corresponding to 5 to 8 Hz; and frequency data of alpha waves corresponding to 9 to 12 Hz.

Specifically, the frequency data corresponding to delta waves of 1, 2, 3, and 4 Hz, the frequency data corresponding to theta waves of 5, 6, 7, and 8 Hz, and the frequency data corresponding to alpha waves of 9, 10, 11, and 12 Hz are stored in the data storage 200 in a form of database.

In addition, according to electric currents selected by the selection unit 100, the operation controller 300 selects a plurality of pieces of frequency data corresponding to any one of the delta waves, theta waves, and alpha waves, which are related to sleep.

In addition, the operation controller 300 generates a plurality of monaural beats in a form of high carrier frequency by adding a low carrier frequency to each of these pieces of frequency data, selects a main frequency from among the plurality of monaural beats before adjusting decibels of the remaining monaural beats to be lowered on the basis of the main frequency, and then generates and outputs one mixed monaural beat as a wave file by mixing all the monaural beats.

In addition, the audio output unit 400 outputs the mixed monaural beat through the operation controller 300. In this case, a normal speaker may be used, and the mixed monaural beat is output while maintaining a predetermined distance (for example, 30 cm) to the speaker from a user's ear, so as to adjust the user's brain waves, whereby sleep may be induced.

Figure 2:
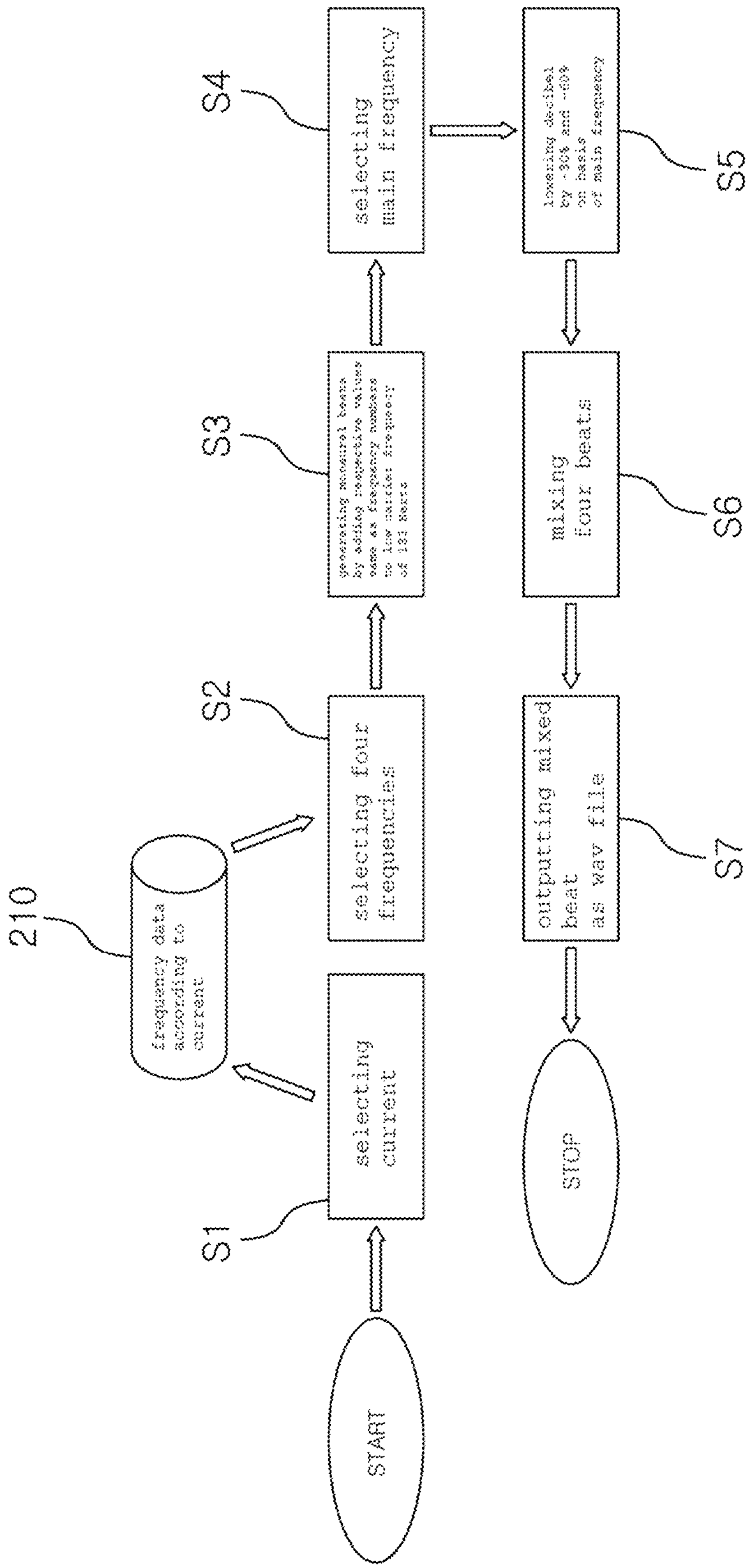
FIG. 2 is a flowchart illustrating the layering and mixing of the monaural beats to help sleep according to the present disclosure.
Figure 3:
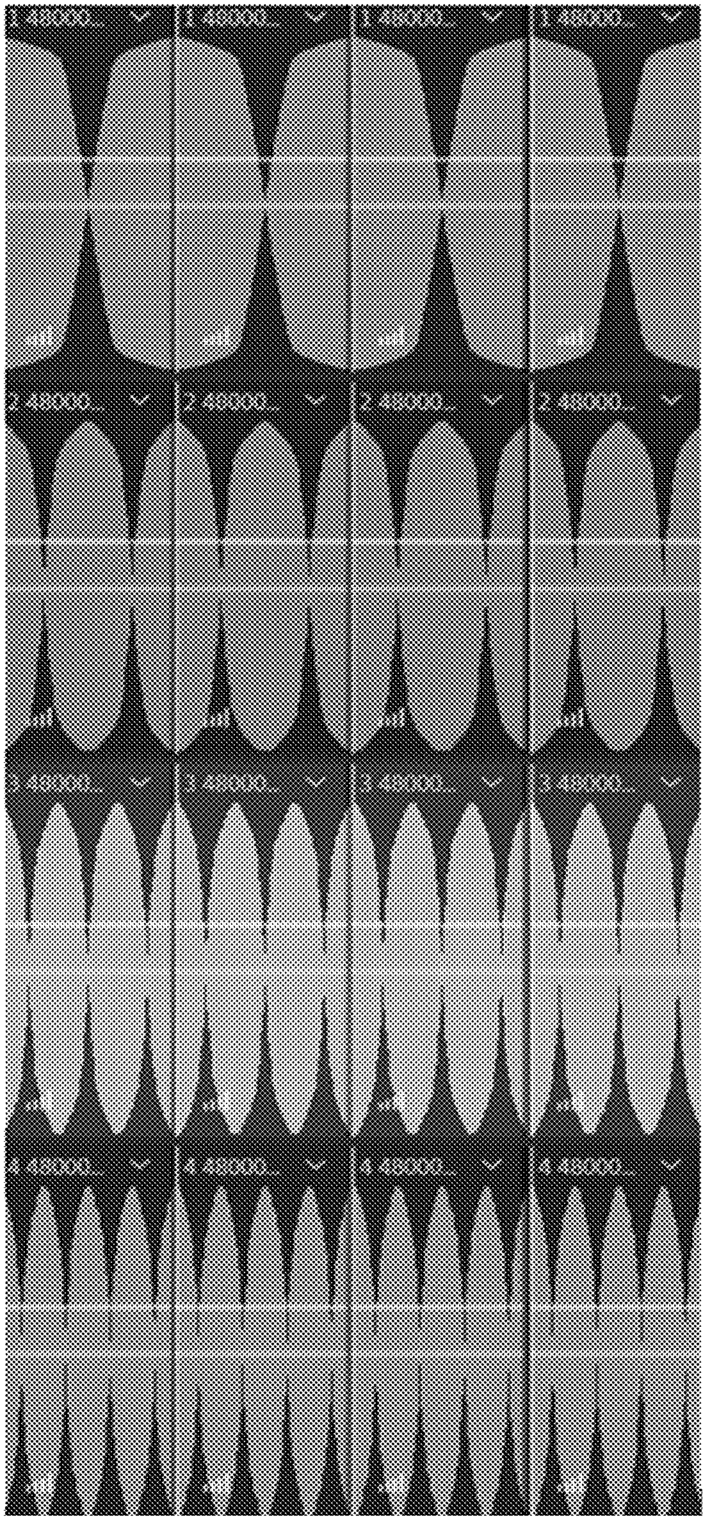
FIG. 3 is a view illustrating an example of monaural beat waveforms according to the present disclosure.
Figure 4A:
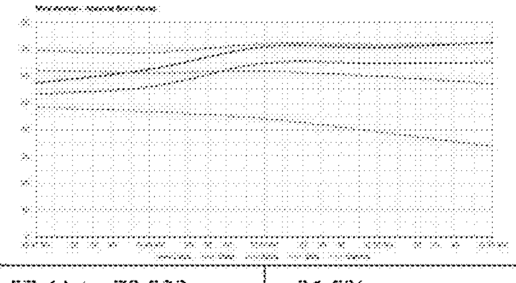
FIGS. 4A to 4H are experimental result tables of layered monaural beats output through the layering and mixing of the monaural beats according to the present disclosure.
Figure 4A:
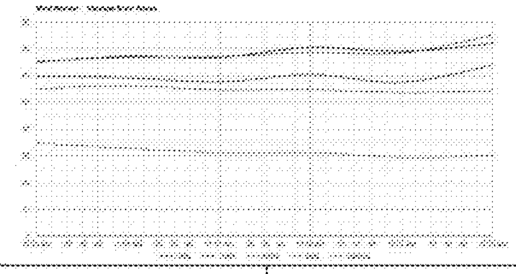
Figure 4A:
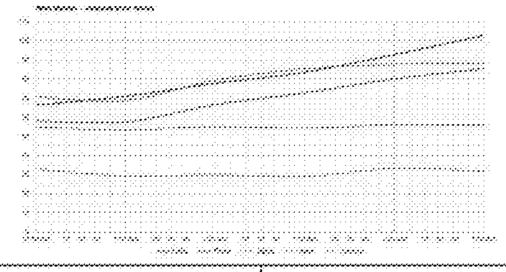
Figure 4B:
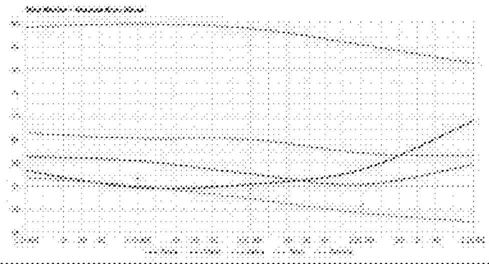
Figure 4B:
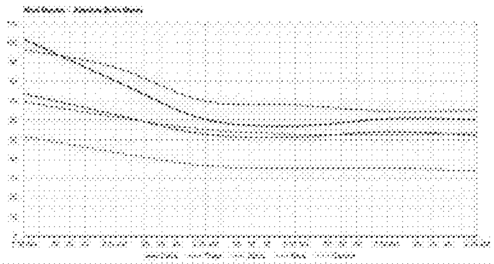
Figure 4B:
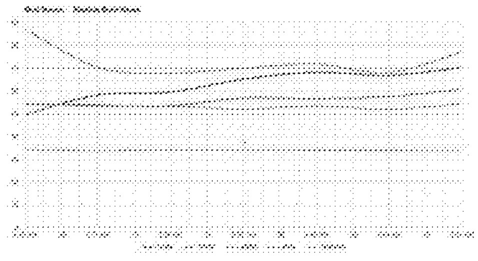
Figure 4C:
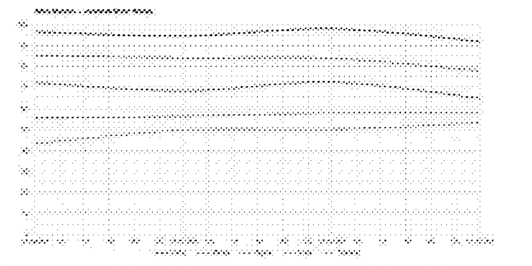
Figure 4C:
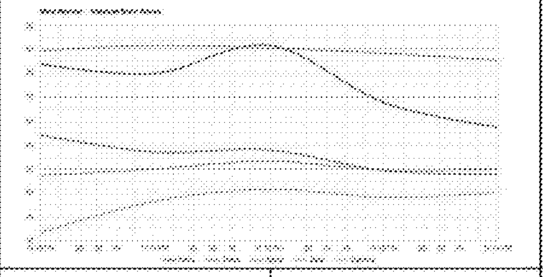
Figure 4C:
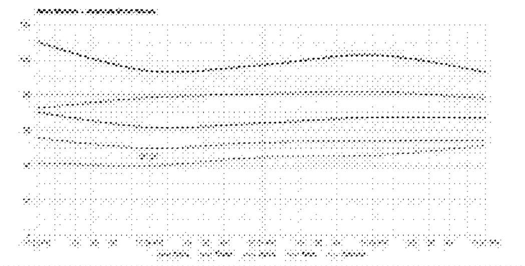
Figure 4D:
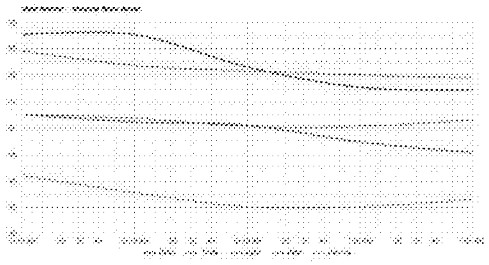
Figure 4D:
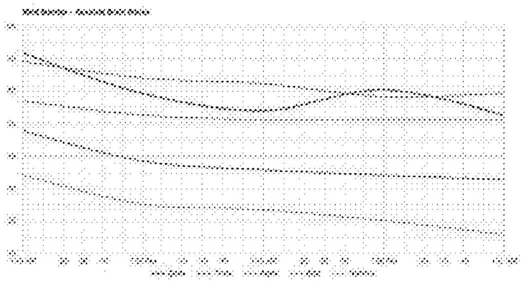
Figure 4D:
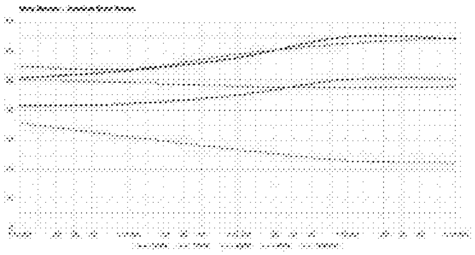
Figure 4E:
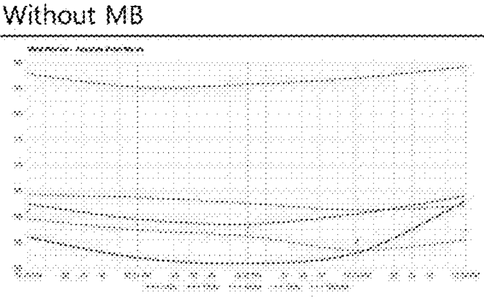
Figure 4E:
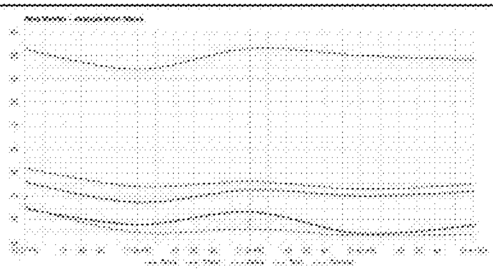
Figure 4E:
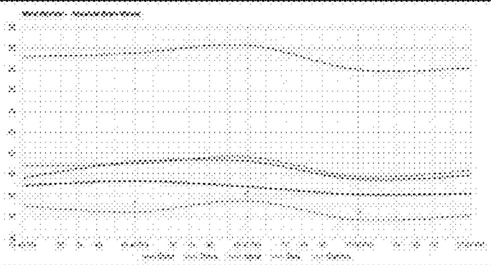
Figure 4F:
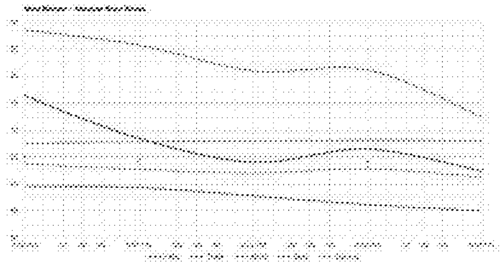
Figure 4F:
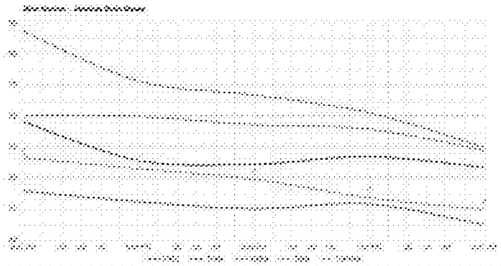
Figure 4F:
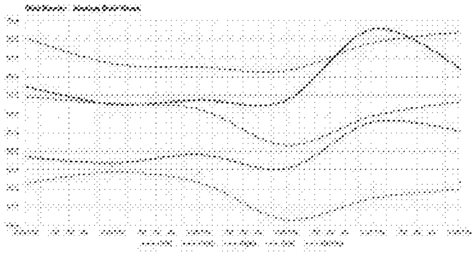
Figure 4G:
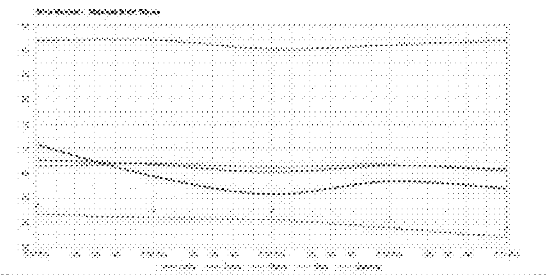
Figure 4G:
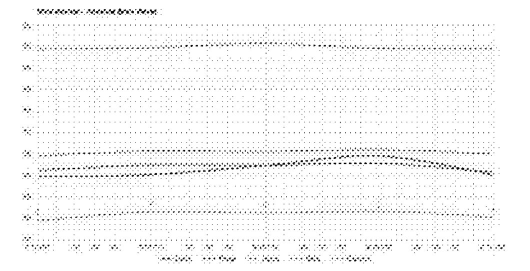
Figure 4G:
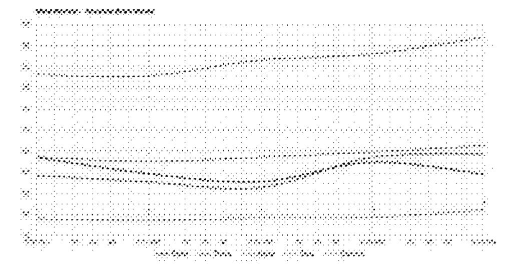
Figure 4H:
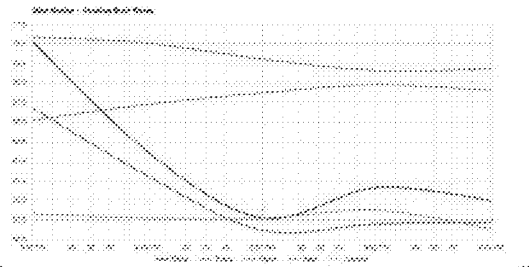
Figure 4H:
Figure 4H:
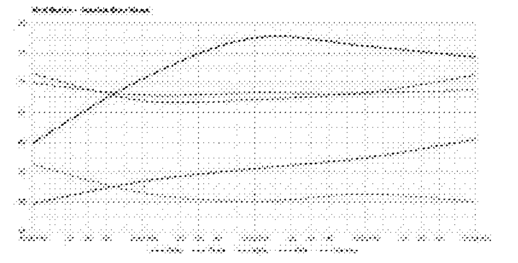

Hereinafter, with reference to FIGS. 2 and 3, a process of layering and mixing monaural beats to help sleep according to the present disclosure will be described in detail.

First, in a case of performing brainwave entrainment with one frequency, a time for interlocking takes long, so four waves in electric currents are provided simultaneously to help a user to perform the brainwave entrainment in a faster time. To this end, the embodiment of the present disclosure performs a series of processes including: selecting a waveform, deriving a related frequency and Hertz, generating a monaural beat for each Hertz, selecting a main frequency, adjusting a decibel (e.g., by −30%, −60%, and −90%) for each frequency centered on the main frequency, and mixing each monaural beat into one wave file.

First, an electric current is selected by a selection unit 100. This is step S1 of selecting a brain wave waveform of one of delta waves, theta waves, and alpha waves.

When the electric current (i.e., the brain wave waveform) is selected in this way, the operation controller 300 loads frequency data according to the selected electric current (the brain wave waveform) from a database 210 of the data storage 200. In this case, the selection unit 100 loads frequency data corresponding to 1, 2, 3, and 4 Hz when delta waves are selected, loads frequency data corresponding to 5, 6, 7, and 8 Hz when theta waves are selected, and loads frequency data corresponding to 9, 10, 11, and 12 Hz when alpha waves are selected.

In this case, according to the selecting of one of the delta waves, theta waves, and alpha waves, four frequencies are selected as frequency data of a corresponding frequency band. For example, in step S2, in a case of delta waves, the frequencies of 1, 2, 3, and 4 Hz are selected.

In this way, a monaural beat is generated for each selected frequency. In this case, in step S3, each of a plurality of monaural beats having a form of high carrier frequencies is generated by adding respective selected frequency numbers to a low carrier frequency of 133 Hz as a base point.

In this case, for example, in the case of delta waves, "133+1 Hz", "133+2 Hz", "133+3 Hz", and "133+4 Hz" are calculated to generate 134, 135, 136, and 137 Hz frequencies. An example of waveforms of such monaural beats is shown in FIG. 3.

In step S4, a main monaural beat is selected from among the plurality of monaural beats generated through step S3 described above. In this case, selecting the third frequency is usually good for listening, but selection may vary depending on the user's preferences.

Naturally, the main monaural beat may be selected and received as an input by the selection unit 100. For example, when a preceding frequency is selected, an interval between waves is short.

In step S5, decibels of the remaining monaural beats are adjusted to be lowered by −30% and −60% with the main monaural beat, as a base point, selected through step S4 described above.

For example, in a case of delta waves, a decibel of a monaural beat of 1 Hz is lowered by −60%, a decibel of a monaural beat of 2 Hz is lowered by −30%, a decibel of a monaural beat of 3 Hz (i.e., a main monaural beat) is maintained as it is, and a decibel of a monaural beat of 4 Hz is lowered by −30%.

In addition, in step S6, the plurality of monaural beats adjusted through step S5 is mixed with each other.

In addition, in step S7, the mixed monaural beat is output as an analog wave file.

FIGS. 4A to 4H are views illustrating recording of relative decibels of delta waves, theta waves, beta waves, alpha waves, and gamma waves by measuring brain waves in the frontal lobe with an Muse2 device, and illustrating tables of experimental results recorded in sequence of three conditions (i.e., a condition of when playing nothing to listen to, a condition of when playing a monaural beat, and a condition of when playing a layered monaural beat of the present disclosure). A resting time of one minute was set so as not to affect the experiment of each condition. A speaker device was placed at a distance of 30 cm from a test subject's ear, and all the test subjects had normal hearing and did not take caffeine or drugs before the experiment. Eight test subjects (i.e., six women, two men; 19 to 28 years old) participated in the experiment.

As a result of the experiment, it may be confirmed that the test subjects' delta waves decreased by −2.04% on average in a state without hearing anything, but the test subjects' delta waves increased by +15.79% on average in a state where the layered monaural beat of the present disclosure is reproduced.

Meanwhile, by using a method of a monaural beat sequence algorithm to help sleep, brain waves may be gradually lead to a state of slow sleep waves. This may lead brainwave entrainment on the basis of a sequence of brain waves appearing when humans fall asleep, wherein the sequence is generated so as to output alpha waves for a set time (e.g., 5 minutes), output theta waves for a set time (e.g., 5 minutes), and then output delta waves for a set time (e.g., 5 minutes).

In this case, generating and outputting monaural beats may be repeated while decreasing respective frequencies step by step. In this case, a monaural beat may be generated for each Hertz by deriving a frequency and Hertz according to time (e.g., 30 seconds or 1 minute).

As an example of such a method, monaural beats may be generated and output in a sequence such as an alpha wave of 12 Hz for 1 minute→an alpha wave of 10 Hz for 1 minute→an alpha wave of 10 Hz for 1 minute→a theta wave of 8 Hz for 1 minute→a theta wave of 7 Hz for 1 minute→a theta wave of 6 Hz for 1 minute→a theta wave of 5 Hz for 1 minute→a delta wave of 4 Hz for 1 minute→a delta wave of 3 Hz for 1 minute→a delta wave of 2 Hz for 1 minute→a delta wave of 1 Hz for 30 seconds→a delta wave of 0.5 Hz for 30 seconds.

In addition, the monaural beats may be mixed and output by using the method of the monaural beat sequence algorithm to help sleep, the algorithm being determined according to the user's condition. This method may identify a state of the user's brain waves through a separate brain wave detection device, etc., list in order which wave is currently the most dominant, and gently start brainwave entrainment, thereby inducing waves up to delta waves.

For example, as shown in FIG. 4, in a case of an alpha wave of 69.451%, a beta wave of 62.118%, a delta wave of 57.44%, a theta wave of 53.363%, and a gamma wave of 48.25%, a delta wave may be induced after going through the beta wave and theta wave, starting with the alpha wave that is the most dominant wave.

To summarize the method for layering and mixing monaural beats to help sleep as described above, the method is configured to include: the first step of generating a plurality of monaural beats by loading a plurality of pieces of frequency data according to a selected brain wave waveform; the second step of adjusting decibels of the plurality of monaural beats; and the third step of generating one analog wave file by mixing the plurality of adjusted monaural beats.

In this case, the first step is the step of generating the plurality of monaural beats having the form of high carrier frequencies by adding respective piece of frequency data to a low carrier frequency.

The frequency data is selected from the frequency data of delta waves corresponding to 1 to 4 Hz, the frequency data of theta waves corresponding to 5 to 8 Hz, and the frequency data of alpha waves corresponding to 9 to 12 Hz. The low carrier frequency is 133 Hz. In the monaural beats, respective values same as selected frequency numbers are added to generate each of the plurality of monaural beats having the form of high carrier frequencies.

In addition, the second step is the step of selecting a main monaural beat from among the plurality of monaural beats and adjusting decibels of the remaining monaural beats to be lowered.

In addition, the method of the present disclosure further includes a fourth step of selecting a brain wave waveform of any one of delta waves, theta waves, and alpha waves before the first step.

The above description is merely illustrative of the technical idea of the present invention, and those skilled in the art to which the embodiment of the present disclosure pertains will appreciate that various modifications, additions, and substitutions are possible without departing from essential characteristics of the embodiment of the present disclosure. The protection scope of the embodiment of the present disclosure should be construed according to the following claims, and all the technical ideas within equivalent scope thereof should be construed as being included in the scope of rights of the present disclosure.

The invention claimed is:

1. A method for layering and mixing monaural beats to help sleep, the method comprising:

a first step of generating a plurality of monaural beats by loading a plurality of pieces of frequency data according to a selected brain wave waveform;

a second step of adjusting decibels of the plurality of monaural beats; and a third step of generating one wave file by mixing the plurality of adjusted monaural beats;

wherein the first step is a step of generating the plurality of monaural beats to have high carrier frequencies by adding respective pieces of frequency data to a low carrier frequency.

2. The method of claim 1, wherein the frequency data is selected from frequency data of delta waves corresponding to 1 to 4 Hz, frequency data of theta waves corresponding to 5 to 8 Hz, and frequency data of alpha waves corresponding to 9 to 12 Hz, the low carrier frequency is 133 Hz, and in the monaural beats, respective values same as selected frequency numbers are added to generate each of the plurality of monaural beats having the high carrier frequencies.

3. The method of claim 1, wherein the second step is a step of selecting a main monaural beat from among the plurality of monaural beats and adjusting decibels of remaining monaural beats to be lowered.

4. The method of claim 1, further comprising:

a fourth step of selecting the brain wave waveform of from any one of delta waves, theta waves, and alpha waves before the first step.

* * * * *